United States Patent [19]

Smith

[11] Patent Number: 5,275,830
[45] Date of Patent: Jan. 4, 1994

[54] REDUCED-FAT, READY-TO-EAT FOOD ITEM

[75] Inventor: John J. Smith, Hoffman Estates, Ill.

[73] Assignee: The Quaker Oats Company, Chicago, Ill.

[21] Appl. No.: 901,441

[22] Filed: Jun. 19, 1992

[51] Int. Cl.$^5$ ............ A23L 1/42; A23L 1/29; A23L 1/105

[52] U.S. Cl. .................. 426/93; 426/21; 426/20; 426/44; 426/52; 426/94; 426/289; 426/302; 426/618; 426/619; 426/620; 426/621

[58] Field of Search ............ 426/93, 94, 549, 618, 426/619, 620, 621, 20, 21, 44, 52

[56] References Cited

U.S. PATENT DOCUMENTS

| | | | |
|---|---|---|---|
| 3,876,811 | 4/1975 | Bonner et al. | 426/93 |
| 4,018,901 | 4/1977 | Hayward et al. | 426/72 |
| 4,038,423 | 7/1977 | Hayward et al. | 426/72 |
| 4,039,688 | 8/1977 | Hayward et al. | 426/92 |
| 4,152,462 | 5/1979 | Hayward et al. | 426/72 |
| 4,451,488 | 5/1984 | Cook et al. | 426/89 |
| 4,497,840 | 2/1985 | Gould et al. | 426/620 |
| 4,565,702 | 1/1986 | Morley et al. | 426/302 |
| 4,913,919 | 4/1990 | Cornwell et al. | 426/302 |
| 4,996,063 | 2/1991 | Inglett | 426/21 |
| 5,024,996 | 6/1991 | Ringe | 426/621 |
| 5,082,673 | 1/1992 | Inglett | 426/21 |
| 5,151,283 | 9/1992 | Foehse et al. | 426/621 |

*Primary Examiner*—Jeanette Hunter
*Assistant Examiner*—Mary S. Mims
*Attorney, Agent, or Firm*—Mart C. Matthews; Lars S. Johnson

[57] ABSTRACT

The present invention relates to a reduced-fat, ready-to-eat food item comprising a cereal component, a water-soluble dietary fiber composition component, and a binding agent component, wherein a sufficient amount of each component is used to provide for said food item to be formed into a desired shape and maintain said shape.

18 Claims, No Drawings

REDUCED-FAT, READY-TO-EAT FOOD ITEM

FIELD OF INVENTION

The present invention relates to a reduced-fat, ready-to-eat food item comprising a cereal component, a water-soluble dietary fiber composition component, and a binder component. In a preferred embodiment, the present invention comprises a reduced-fat, ready-to-eat granola food bar having good flavor and texture.

BACKGROUND OF INVENTION

Ready-to-eat food items, especially food bars, or snack bars as they may be appropriately termed, are known and have been available for some time. Some snack bars generally contain one or more grains, nuts, dried fruit, sweeteners and other ingredients. These ingredients are typically mixed with a binder such as a sugar syrup or shortening and compressed into bars or slabs which may be later cut to a desired size. Depending on the snack bar's composition, it may be mixed, formed, and/or baked prior to packaging and sale.

Consumers who purchase and eat these snack bars may be health conscious and thus careful about what they eat. For such consumers, these food bars, or snack bars, would be even more desirable if they contained reduced-fat levels. However, in such food bars,, fat is typically added in the preparation of the bar. Fat may be added as a binding agent and/or in the form of an oil, which acts to keep the food bar tender and imports other desirable organoleptic properties, such as flavor and mouthfeel. When the oil is not added, or is replaced with water and sugar syrup, the resulting food bar has a poor texture in that it is excessively hard and brittle, and thus is typically not as acceptable to consumers. In the present invention, however, when the water-soluble dietary fiber composition of the present invention is added to food items, particularly food bars, as a replacement for such oils, it has been surprisingly found that a reduced-fat, ready-to-eat food item can be prepared with few, if any, of these undesirable effects.

BACKGROUND ART

As already stated herein, ready-to-eat food bars are known. U.S. Pat. No. 4,451,488, issued May 29, 1984 to Cook et al., discloses a ready-to-eat food bar. This food bar typically comprises a granola mix, corn syrup, crisp rice, sugar,, glycerin, shortening, salt and other flavorings, and antioxidants. The food bar also may contain nuts, chocolate chips, and dried fruit. The granola mix typically comprises oat and wheat flakes, peanuts, whey solids, milk solids, coconut, sugar, corn syrup, oil, and honey. The oil is typically added to the granola mix to keep the product tender.

A process for preparing water-soluble dietary fiber compositions from oats is also known to those skilled in the art. U.S. Pat. No. 4,996,063, issued Feb. 26, 1991 to Inglett, teaches preparing water-soluble dietary fiber compositions by treating an aqueous dispersion of a gelatinized, milled, oat substrate with an alpha-amylase under conditions which will hydrolyze the substrate and yield a soluble fraction and an insoluble fraction, separating said soluble fraction from said insoluble fraction, and recovering from said soluble fraction said water-soluble dietary fiber substantially free of water-insoluble fiber.

However, neither of these references teach or suggest that the water-soluble dietary fiber prepared in accordance with the process of the '063 patent would be useful as a partial or total replacement for the oil in the food item of the present invention, or that such replacement would provide a food item having a lower fat content, yet still having a texture comparable to that of a food item not having the reduced-fat content.

It is therefore an object of the present invention to provide a reduced-fat, ready-to-eat food item, preferably in the form of a bar, having texture and flavor properties comparable to those of food items not having a reduced-fat content.

These objects are accomplished by the invention described herein.

SUMMARY OF THE INVENTION

The present invention relates to a reduced-fat, ready-to-eat food item comprising a cereal component, a water-soluble dietary fiber composition component, and a binding agent component, wherein a sufficient amount of each component is used to provide for said food item to be formed into a desired shape and maintain said shape.

DETAILED DESCRIPTION OF THE INVENTION

The present invention relates to a reduced-fat, ready-to-eat food item comprising a cereal component, a water-soluble dietary fiber component, and a binding agent component, all of which are combined and may be formed into a desired shape, preferably a bar shape. The amount of each component used is that amount necessary to provide a final product that may be formed into a shape and maintain that shape. Of course, the formed shape may be further manipulated. For example, if a sheet of product were prepared, it could be cut into smaller and differing shapes, or broken into smaller pieces.

In a preferred embodiment, the cereal and water-soluble dietary fiber components are combined to form an initial mixture, and said initial mixture is then combined with the binding agent component to form the ready-to-eat food item, and the ready-to-eat food item is then formed into the desired shape.

Cereal Component

The cereal component of the ready-to-eat food item may comprise any cereal known to those skilled in the art, including, but are not limited to oat, wheat, barley, rice, corn, and mixtures thereof, with oat and mixtures of oat and wheat being preferred.

In a preferred embodiment, the cereal is flaked. The flaking of cereal is well known to the cereal industry and it is intended that this invention include cereal f lakes made from processes well known. Of particular importance in this invention are cereal f lakes selected f rom the group comprising oat flakes, wheat flakes, barley flakes, and mixtures thereof. It has been found to be particularly desirable to utilize either oat flakes or a combination of oat flakes and wheat flakes in this invention.

The cereal may optionally be processed and/or modified by any method known to those skilled in the art to render it acceptable for consumption. Examples of ways in which the cereal may be processed and/or modified is dehulling, cooking, roasting, pregelatinizing, puffing, extrusion from an extrusion device, crisping, and combinations thereof, with puffing and crisping being preferred and crisping being most preferred. By "crisping" it is meant the process as described in U.S. Pat. No. 4,623,546, issued Nov. 18, 1986 to Holay et al., the disclosure of which is incorporated herein by reference.

In a more preferred embodiment, the cereal component comprises a mixture of flaked cereals and processed cereals.

The amount of cereal component utilized in the food item of the present invention is that amount necessary to provide for said food item to be formed into and maintain a desired shape, and will vary according to the type of cereal used, the type or types of processing and/or modification the cereal is subjected to, and the desired flavor and textural characteristics of the food item. However, the total amount of cereal component will typically be in the range of from about 15% to about 85%, preferably from about 15% to about 80%, more preferably from about 19% to about 52% by weight of the ready-to-eat food item.

In a more preferred embodiment, the cereal component comprises a mixture of from about 8% to about 30%, preferably from about 10% to about 22% by weight oat flakes, from about 2% to about 20%, preferably from about 4% to about 10% by weight wheat flakes, and from about 5% to about 30%, preferably from about 5% to about 20% by weight crisp rice, based upon the total weight of the ready-to-eat food item.

Water-Soluble Dietary Fiber Component

The food item of the present invention also comprises a sufficient amount of a water-soluble dietary fiber composition component to provide for said food item to be formed into and maintain a desired shape, typically from about 0.5% to about 25%, preferably from about 0.6% to about 10%, more preferably from about 0.8% to about 1.3% by weight of the ready-to-eat food item. As will be discussed later, the water-soluble dietary fiber composition may also be utilized as an optional ingredient of the binding agent. The percentages set forth here do not include water-soluble dietary fiber composition as such an optional ingredient, but only include water-soluble dietary fiber composition as a component of the ready-to-eat food item separate from the binding agent.

The water-soluble dietary fiber composition comprises a mixture of maltodextrin and beta-glucans at a ratio sufficient to impart softening and tenderizing properties to the ready-to-eat food item, typically at a ratio of from about 1:1 to about 500:1, preferably from about 2:1 to about 20:1, more preferably from about 3:1 to about 15:1.

This maltodextrin and beta-glucans mixture may be obtained by any means known to those skilled in the art. For example, maltodextrin and beta-glucans may be obtained separately and then combined. In such a case, the betaglucans may be in a purified form or may be in combination with other agents. As an example, cellulose gum contains beta-glucans and can be combined with the maltodextrin to prepare the water-soluble dietary fiber composition of the present invention.

The water-soluble dietary fiber composition may also be prepared by treating a processed beta-glucan containing grain with alpha-amylase to form a maltodextrin and beta-glucan containing mixture. In a preferred embodiment, the water-soluble dietary fiber composition is prepared by a method comprising treating an aqueous dispersion of a gelatinized, milled beta-glucan containing grain substrate with an alpha-amylase under conditions which will hydrolyze the substrate and yield a soluble fraction and an insoluble fraction; separating said soluble fraction from said insoluble fraction using any separation means known to those skilled in the art, with one or more centrifugation steps being preferred, a single centrifugation step being more preferred, and a single decanting step being most preferred; and recovering from said soluble fraction said water-soluble dietary fiber substantially free of water insoluble fiber, in accordance generally with the method described in U.S. Pat. No. 4,996,063, issued Feb. 26, 1991 to Inglett, the disclosure of which is incorporated herein by reference, or by any method providing an equivalent product. Examples of beta-glucan containing grain substrates include, but are not limited to, oat, rice and barley, with oat being preferred. For use in the present invention the alpha-amylase enzyme may be derived from natural sources such as *Bacillus stearothermophilus* and *Bacillus licheniformis*.

Binding Agent

The binding agent used for the food item of the present invention may be any binding agent capable of providing sufficient adhesion to the food item to enable it to be formed into a desired shape, preferably a bar shape, and retain the desired shape. The binding agent may be a single ingredient or a mixture of ingredients. When in the form of a mixture of ingredients, the binding agent may be thought of as a binding system comprising all the ingredients added to impart adhesion to the individual components of the food item, as well as other optional ingredients such as flavoring agents, etc., which may not necessarily be added to impart adhesion, but may be added via the binding agent for convenience. These ingredients may be first combined and then added as combined to the cereal and water-soluble dietary fiber composition components. Alternatively, the cereal, water-soluble dietary fiber composition, and individual binding agent ingredients may be either combined simultaneously or sequentially, in no particular order, to prepare the food item of the present invention.

Examples of binding agents useful in the present invention include sugar syrup, corn syrup, high maltose corn syrup, high fructose corn syrup, fructose syrup (crystalline fructose+$H_2O$ to 67° Brix), corn syrup solids, shortening, honey, brown sugar, and mixtures thereof, with a combination of high maltose corn syrup, high fructose corn syrup, and corn syrup solids being preferred. As already stated herein, shortening is a binding agent that is known in the art. However, in the context of the reduced-fat items of the present invention, shortening is not a desirable binding agent.

In a preferred embodiment, the binding agent may also comprise the water-soluble dietary fiber composition as already described herein. The water-soluble dietary fiber composition is combined with the binding agent prior to the binding agent being combined with the cereal and water-soluble dietary fiber composition components.

A most preferred binding agent is a syrup comprising from about 0.5% to about 3%, more preferably from about 1.5% to about 2.5% by weight water-soluble dietary fiber composition; from about 3% to about 15% by weight high maltose corn syrup; from about 3% to about 15% by weight high fructose corn syrup; from about 1% to about 7% by weight corn syrup solids; from about 1% to about 6% by weight glycerol; from about 0.5% to about 2% by weight sorbitol; and from about 0.1% to about 0.7% by weight salt, based upon the total weight of the ready-to-eat food item.

The syrup may optionally contain brown sugar, peanut butter, raisin juice concentrate, and flavoring agents, including, but not limited to, coconut flavor, and mixture thereof.

The amount of binding agent used is that amount necessary to provide sufficient adhesion to allow the ready-to-eat food item to be formed into a desired shape and maintain that shape. The specific amount of binding agent necessary to accomplish this will depend upon the type of binding agent used. However, the necessary adhesion can typically be accomplished with from about 5% to about 50%, preferably from about 8% to about 40%, more preferably from about 10% to about 35% by weight binding agent based upon the total weight of the ready-to-eat food item.

As already stated herein, in a preferred embodiment the cereal and water-soluble dietary fiber composition components are first combined to form an initial mixture, and said initial mixture is then combined with the binding agent to form the ready-to-eat food item. The amount of cereal and water-soluble dietary fiber composition components contained in the initial mixture are those amounts necessary to form the final food item into a desired shape and maintain said desired shape, as already described herein.

More preferably, the initial mixture comprises a base component and a coating component. The coating component is used to coat the base component, in which case the initial mixture is in the form of a granola cereal.

The base component used to prepare this granola cereal comprises a cereal component as already described herein, milk solids, and coconut and/or coconut flavor, preferably natural coconut flavor. Milk solids are important to the invention, and it is desirable that at least some amount of milk solids be added. This contributes to the protein as well as provides some binding characteristics which are highly desired. The milk solids also contribute flavor to the food item. The natural coconut flavor is flavoring essence derived from coconut.

The coating component used to prepare this granola cereal comprises sugar,, water-soluble dietary fiber composition, and a sugar solution.

Included in the coating component is sugar. As used herein, the term "sugar" is intended to mean an agent which imparts adhesion to the base component and incidentally imparts sweetness to the total cereal composition. Examples of "sugars" useful herein include, but are not limited to, sucrose, fructose, brown sugar, corn syrup, high fructose corn syrup, high maltose corn syrup, corn syrup solids, and mixtures thereof, with brown sugar being preferred. Preferably the sugar is substantially unrefined.

The coating component of the ready-to-eat cereal also includes a sugar solution. As used herein, the term "sugar solution" means a solution added to provide additional sweetness and flavor separate from the sugar compound of the coating component. The sugar solution is made from sugars, which preferably have been unprocessed, and/or else syrups, preferably natural. Included in this group are honey, which is preferred, molasses, maple syrup, and sucrose solutions, and mixtures thereof.

The coating component also contains a sufficient amount water to make the coating component liquid.

The water-soluble dietary fiber composition included in the coating component is as already described herein.

In a still more preferred embodiment of the present invention, the ready-to-eat food item is in the form of a granola type food item and comprises:

(a) a dry mix comprising from about 20% to about 50% by weight of a granola cereal component and from about 5% to about 20% by weight of a processed grain component, wherein said granola cereal component comprises:

(i) from about 18% to about 35% by weight of a base component, wherein said base component comprises from about 14% to about 32% by weight cereal flakes and from about 1.5% to about 3% by weight milk solids; and (ii) from about 6% to about 15% by weight of a coating component, wherein said coating component comprises from about 5% to about 9% by weight sugar, from about 0.8% to about 1.3% by weight water-soluble dietary fiber composition, from about 0.3% to about 6% by weight of a sugar solution, and sufficient water to make the coating component liquid;

wherein said base component is enrobed by said coating component and wherein said enrobed base is dried to a moisture content of below about 3.5 percent; and (b) sufficient binding agent to provide for said dry mix to be formed into a desired shape and maintain said shape.

All of the weight percentages expressed in this more preferred embodiment are percentages of the total weight of the ready-to-eat food item, and exclude any water added in the preparation.

In a still more preferred embodiment of the present invention, the ready-to-eat food item is in the form of a granola-type food item and comprises:

(a) from about 30% to about 60% by weight of a dry mix, wherein said dry mix comprises from about 20% to about 50% by weight of a granola cereal component and from about 5% to about 20% by weight of crisp rice, and wherein said granola cereal component comprises:

(i) from about 18% to about 35% by weight of a base component comprising from about 10% to about 22% by weight oat flakes, from about 4% to about 10% by weight wheat flakes, from about 1.5% to about 3% by weight coconut and/or from about 0.009% to about 0.2% by weight natural coconut flavor, and from about 1.5% to about 3.0% by weight milk solids;

(ii) from about 6% to about 15% by weight of a coating component comprising from about 5% to about 9% by weight sugar, from about 0.8% to about 1.3% by weight water-soluble dietary fiber composition, from about 0.3% to about 6% by weight honey, and sufficient water to make the coating component liquid;

wherein said base component is enrobed by said coating component and wherein said enrobed base is dried to a moisture content of below about 3.5 percent; and (b) from about 10% to about 35% by weight of a syrup binding agent, wherein said syrup binding agent comprises from about 3% to about 15% by weight high maltose corn syrup; from about 3% to about 15% by weight high fructose corn syrup; from about 1% to about 7% by weight corn syrup solids; from about 1.5% to about 2.5% by weight water-soluble dietary fiber composition, from about 1% to about 6% by weight glycerol; from about 0.5% to about 2% by weight sorbitol; and from about 0.1% to about 0.7% by weight salt.

All of the weight percentages expressed in this most preferred embodiment are percentages of the total weight of the ready-to-eat food item, and exclude any water added in the preparation.

The food item of the present invention may be of any desired texture, including crisp or soft and chewy, etc., with soft and chewy being preferred.

A food item having a soft and chewy texture may require optional ingredients, including but not limited to humectants such as polyhydric alcohols, and will typically include from about 0.5% to about 10%, preferably from about 1% to about 6% by weight of glycerol, and from 0% to about 4%, preferably from about 0.5% to about 2% by weight of sorbitol, based upon the total weight of the food item.

In a preferred embodiment of the present invention, the ready-to-eat food item is in the shape of a bar having a thickness in the range of from about 0.75 cm to about 1.8 cm; a width in the range of from about 2.3 cm to about 3.3 cm; and a length in the range of from about 8.9 cm to about 12.7 cm.

The moisture content of the ready-to-eat food item of the present invention is in the range of from about 1.0% to about 3.5%, preferably from about 2.0% to about 3.0% by weight when no fruit is added. If fruit, such as raisins and/or dates, is added, then the overall moisture content of the final product will be in the range of from about 1.0% to about 6.0%, preferably from about 2.0% to about 3.0% by weight. Substantial deviation from the specified moisture content will result in a product which is not desirable.

The ready-to-eat food item of the present invention typically has a density in the range of from about 0.25 to about 0.60, preferably from about 0.28 to about 0.55, more preferably from about 0.40 to about 0.47 gram per cubic centimeter.

Other Optional Ingredients

The ready-to-eat food item may contain a number of other edible ingredients. For example, the ready-to-eat food item may include dehydrated fruit, typically from about 1% to about 25%, preferably from about 5% to about 25% by weight, based upon the total weight of the ready-to-eat food item. The dehydrated fruit is optional but is desirable and is contained in a preferred embodiment of the present invention. Of particular desirability are dehydrated fruits such as raisins, dates, apples, strawberries, blueberries, cranberries, raspberries, and mixtures thereof. The dehydrated fruit may be combined with the cereal, water-soluble dietary fiber composition, and binding agent components in any order prior to shaping, including simultaneously or in any sequential order. In a preferred embodiment, the dehydrated fruit is added to either the initial mixture, to the initial mixture/binding agent combination prior to forming, or both.

The ready-to-eat food item of the present invention may also optionally include edible nuts and/or nut pieces. When included in the food item of the present invention, such edible nuts and/or nut pieces typically comprise from about 1% to about 15% by weight, based upon the total weight of the ready-to-eat food item. Examples of nuts and nut pieces which are useful in the present invention include, but are not limited to, almonds, peanuts, almond pieces, peanut pieces, and mixtures thereof. The almonds are preferably subdivided or shredded to a small particle size for the inclusion in the product. The nuts and/or nut pieces may be added to the ready-to-eat food item in the same manner as the dehydrated fruit, including the same preferred methods.

Other optional ingredients may also be included in the food item. Of course, it is preferred that such optional ingredients not detract from the reduced-fat nature of the food item. Examples of such optional ingredients include, but are not limited to raisins, carob, honey, spices such as cinnamon, and mixtures thereof. The optional honey referred to in this paragraph is typically added when no honey is used either as the binding agent or as part of the sugar solution in the coating, as already described herein. For example, the honey may be added separate from a binding agent which doesn't contain honey, or from a coating which has a sugar solution which doesn't contain honey. Other optional ingredients which may be incorporated into the food item, but which are not in the spirit of the reduced-fat nature of the food item of the present invention, and therefore are not preferred, include chocolate chips, chocolate filling, chocolate covering, confectioner's coatings, and mixtures thereof.

When included in the food item of the present invention, raisins typically comprise from about 1% to about 15%, preferably from about 5% to about 10% by weight of the total weight of the food item; carob typically comprises from about 5% to about 25%, preferably from about 10% to about 15% by weight of the food item; honey, separate from its use as a binding agent or sugar solution in the coating already described herein, typically comprises from about 0.5% to about 5%, preferably from about 2% to about 5% by weight of the food item; and cinnamon typically comprises from 0% to about 1%, preferably from about 0.5% to about 0.6% by weight of the food item.

Antioxidants may also be added to the food item to act as a preservative. Examples of antioxidants useful herein include, but are not limited to, artificial antioxidants such as BRA, BHT, TBHQ and natural antioxidants such as tocopherols and rosemary, with tocopherols being preferred. When included in the food item of the present invention, these antioxidants typically comprise from about 0.0001% to about 0.1%, preferably from about 0.005% to about 0.07% by weight of the food item.

Flavoring agents may also be included in the food item of the present invention. Examples of flavoring agents useful herein include, but are not limited to, salt, vanilla, apple, strawberry, maple, and peanut butter. When included in the food item of the present invention, such flavoring agents typically comprise from about 0.005% to about 0.5%, preferably from about 0.009% to about 0.2% by weight of the food item.

Process for Preparing the Food Item

The cereal, water-soluble dietary fiber composition, and binding agent components may be combined by any method known to those skilled in the art to form the ready-to-eat food item. Examples of methods useful herein include, but are not limited to, combining all three ingredients, plus any optional ingredients, in a mixing vessel and mixing the ingredients for a period of time sufficient to obtain a substantially uniform interdispersion of the individual ingredients; combining the cereal component and the water-soluble dietary fiber composition component, along with other certain desirable optional ingredients, to form an initial mixture and then coating the initial mixture with the binding agent; and, preferably, combining the binding agent and initial mixture in a mixing vessel and mixing them for a sufficient period of time to provide for a substantially uniform mixing of the components.

The actual forming of the combined components into the desired shape may be accomplished by any method known to those skilled in the art. Examples of methods useful herein include, but are not limited to: pouring a measured amount of the combined components into a forming mold and pressing into the desired size and density; cold forming/extruding; preparing a sheet of the combined components having the desired thickness, preferably from about 0.75 cm to about 1.8 cm, and density, preferably from about 0.25 g/ml to about 0.60 g/ml, preferably from about 0.28 g/ml to about 0.55 g/ml, more preferably from about 0.40 g/ml to about 0.47 g/ml, and then slicing the sheet into smaller subdivisions of the desired shape and size, preferably rectangular shapes having a length in the range of from about 8.9 cm to about 12.7 cm, and a width in the range of from about 2.3 cm to about 3.3 cm; with the sheeting and slicing method being preferred.

The combined components may optionally be dried, with the degree of drying depending upon the desired properties of the ready-to-eat food item. For example, a food item prepared from undried combined components would tend to have a crispy/chewy texture, whereas a food item prepared from combined components dried to a moisture content of less than about 3 percent by weight would have a crunchy/hard texture. In a preferred method, the combined components are dried to a moisture content of less than 3.5% by weight, preferably less than 3.0% by weight.

The combined components may be dried either prior to, during, or after being formed into the desired shape. The drying may be accomplished by any method known to those skilled in the art, including but not limited to an oven, vacuum/oven and microwave, with an oven being preferred.

As already described herein, in a preferred embodiment of the claimed process, the cereal and water-soluble dietary fiber composition components are combined to form an initial mixture, and the initial mixture is then combined with the binding agent to form the ready-to-eat food item.

The initial mixture and binding agent may be combined in any manner known to those skilled in the art to provide for sufficient adhesion to the initial mixture to allow for the ready-to-eat food item to be formed into a desired shape and maintain said desired shape. Examples of useful methods include, but are not limited to, contacting the binding agent with the initial mixture in conjunction with a mixing action in a mixing vessel, which is preferred, and mixing the initial mixture and binding agent for a sufficient period of time to provide for a substantially uniform mixing of the two components; spraying the initial mixture with binding agent; and immersing the initial mixture in binding agent. Examples of ways in which the mixing action may be accomplished include, but are not limited to, hand mixing with a spoon, a continuous solid flight twin screw mixer, a tumbler or enrober, a ribbon mixer, a paddle mixer, and a dual blade mixer, with a paddle mixer or continuous solid flight twin screw mixer being preferred.

Preferably, the binding agent is heated to a temperature in the range of from about 50° C. to about 85° C., preferably from about 60° C. to about 70° C., and is then combined with the initial mixture in a mixing vessel, preferably a bowl, and mixed by a mechanical stirring device, preferably a mixer equipped with a paddle, for a sufficient period of time to provide for a substantially uniform mixture of binding agent and initial mixture, typically for about 1 minute to about 8 minutes, more preferably for about 2 minutes to about 4 minutes. However, if the binding agent has an acceptable viscosity at ambient temperature, then heating will not be necessary.

After being combined, the initial mixture/binding agent mixture may be formed to the desired shape, preferably a bar shape.

As already stated herein, the food items of the present invention may be of any desired consistency including, but not limited to, hard and crunchy, soft and chewy, etc. As also stated herein, additional, optional ingredients may be necessary for preparing food items having the desired texture. Typically, such additional ingredients are added together with the initial mixture and the binding agent.

Depending upon the type of ingredient, the optional ingredients which may be included in the present invention may be added at any point in the process of the present invention, and may be added simultaneously or in any sequential manner.

If dehydrated fruit is to be included in the ready-to-eat food item, then from about 5% to about 25% by weight of dehydrated fruit is preferably admixed with the cereal component of the initial mixture, based upon the total weight of the initial mixture. The final moisture content of the ready-to-eat food item, including the fruit, must then fall within the range of from about 1.0% to about 6.0%, preferably from about 2.0% to about 3.0% by weight.

A more preferred process for preparing the reduced-fat, ready-to-eat food item in the form of a granola type food item comprises:

a. preparing a granola cereal component by the method comprising:
i) preparing a base component by admixing from about 14% to about 32% by weight cereal flakes with from about 1.5% to about 3% by weight milk solids;
ii) preparing a coating component by admixing from about 5% to about 9% by weight sugar, from about 0.8% to about 1.3% by weight water-soluble dietary fiber composition, from about 0.3% to about 6% by weight of a sugar solution, and sufficient water to make the coating component liquid;
iii) heating the coating to a temperature of from about 60° C. to about 70° C.;
iv) enrobing from about 6% to about 15% by weight of the coating onto from about 18% to about 35% by weight of the base; and
v) drying the enrobed base to below about 3.5 percent by weight moisture;

b. combining from about 20% to about 50% by weight of the granola cereal component with from about 5% to about 20% by weight of a processed grain component to form a dry mix;

c. combining the dry mix with sufficient binding agent to provide for said dry mix to be formed into a desired shape and maintain said shape.

All of the weight percentages expressed in this more preferred process are percentages of the total weight of the ready-to-eat food item, and exclude any water added in the preparation.

The admixing of the base component may be accomplished by any means known to those skilled in the art, including any of the means already described herein for mixing ingredients. The admixing of the coating component ingredients may be accomplished by any means known to those skilled in the art, including any of the means described herein for preparing the binding agent. The heating of the coating may be accomplished by any heating means known to those skilled the art. The enrobing may be accomplished by any means known to those skilled in the art, including any of the means described herein for applying the binding agent to the initial mixture. The drying of the enrobed base may be accomplished by any means known to those skilled in the art, including those already described herein for optionally drying the formed ready-to-eat food item. The dry mix and binding agent components may be combined by any methods known to those skilled in the art, including those described herein for combining the initial mixture and binding agent.

In this preferred process it is significant that the temperature must be at a certain elevation in order to provide for proper heating, stickiness, and melting of the coating. However, the temperature cannot be sufficiently high so as to cause degradation of the coating. Therefore, it is necessary that the temperature range be somewhat closely controlled. After the coating is heated, it is enrobed onto the base. This enrobing may be in a conventional cereal enrober.

The granola cereal component and processed grain component may be combined to form a dry mix by any method known to those skilled in the art, including those already described herein for combining the cereal and water-soluble dietary fiber composition components of the initial mixture. It is preferred that the granola cereal and processed grain be combined under conditions sufficient to provide for substantially uniform mixing of the ingredients in the final dry mix. By "substantially uniform", it is meant that the granola cereal component and processed grain component each tend to be distributed throughout the entire dry mix without a significant tendency to be concentrated in any particular region of the dry mix.

A most preferred process for preparing the reduced-fat, ready-to-eat food item in the form of a granola type food item comprises:

a. preparing a granola cereal component by the method comprising:
i) preparing a base component by admixing from about 10% to about 22% by weight oat flakes, from about 4% to about 10% by weight wheat flakes, from about 1.5% to about 3% by weight coconut and/or from about 0.009% to about 0.2% by weight natural coconut flavor, and from about 1.5% to about 3% by weight milk solids;
ii) preparing a coating component by admixing from about 5% to about 9% by weight sugar, from about 0.8% to about 1.3% by weight water-soluble dietary fiber composition, from about 0.3% to about 6% by weight honey, and sufficient water to make the coating component liquid;
iii) heating the coating to a temperature of from about 60° C. to about 70° C.;
iv) enrobing from about 6% to about 15% by weight of the coating component onto from about 18% to about 35% by weight of the base; and
v) drying the enrobed base to below about 3.5 percent by weight moisture;

b. combining from about 20% to about 50% by weight of the granola cereal component with from about 5% to about 20% by weight of crisp rice to form a dry mix;

c. combining from about 30% to about 60% by weight of dry mix with from about 10% to about 35% by weight of a syrup binding agent comprising from about 3% to about 15% by weight high maltose corn syrup; from about 3% to about 15% by weight high fructose corn syrup; from about 1% to about 7% by weight corn syrup solids; from about 1.5% to about 2.5% water-soluble dietary fiber composition; from about 1% to about 6% by weight glycerol; from about 0.5% to about 2% by weight sorbitol; and from about 0.1% to about 0.7% by weight salt to prepare a dry mix/binding agent mixture; and d. forming the dry mix/binding agent mixture into a shape.

All of the weight percentages expressed in this most preferred process are percentages of the total weight of the ready-to-eat food item, and exclude any water added in the preparation.

The dry mix/binding agent mixture is preferably formed into a sheet having a thickness in the range of from about 0.75 cm to about 1.8 cm. When a bar having a hard/crunchy texture is prepared, this sheet is then dried in an oven at a temperature in the range of from about 275° C. to about 375° C., preferably from about 300° C. to about 325° C., for a period of time in the range of from about 10 minutes to about 15 minutes, preferably from about 12 minutes to about 14 minutes. The dried sheet has a moisture content of less than about 3.5% by weight and is subdivided, preferably by cutting, into rectangular bars having a width in the range of from about 2.3 cm to about 3.3 cm and a length in the range of from about 8.9 cm to about 12.7 cm.

Of particular importance is the embodiment of the process of the present invention wherein the dry mix/binding agent mixture is formed into a sheet prior to drying and subdivided after drying.

The present invention is further illustrated, but not limited by, the following examples.

EXAMPLES

Example 1

A water-soluble, dietary fiber composition is prepared in accordance with the process as described in U.S. Pat. No. 4,996,063, issued Feb. 26, 1991 to Inglett, wherein a single decanting step is used to separate the soluble fiber and insoluble fiber in said process.

A base component of a granola cereal is then prepared by admixing 18.1 grams oat flakes, 7.8 grams wheat flakes, 0.18 grams coconut flavor, and 2.6 grams non-fat dry milk solids. These ingredients are thoroughly admixed in a mixer. A coating syrup is prepared by admixing 7.8 grams brown sugar with 1.9 grams of the water-soluble dietary fiber composition, 1.2 grams honey, and 3.6 grams water. This coating component is mixed together and heated to a temperature of about 82° C. After the ingredients are thoroughly mixed at the temperature, the base and coating are placed in a cereal enrober and the coating enrobed onto the cereal base. The resulting granola cereal is then dried in an oven to a moisture content of about 3 percent by weight. The drying is accomplished in an oven having inlet air temperatures of between 270° F., and 290° F., but the temperature of the cereal is never high enough to substantially degrade either the cereal base or the coating thereon. The product thus produced is a granola cereal product.

A binding syrup is separately prepared by combining in a mixing vessel 12.9 grams high fructose corn syrup, 9.7 grams high maltose corn syrup, 5.6 grams corn syrup solids, 2.3 grams water-soluble dietary fiber composition, 4.8 grams honey, 4.8 grams glycerin, 1.6 grams sorbitol, and 0.1 grams salt and other flavorings.

This granola cereal product and binding syrup are then combined with 12.0 grams of crisp rice in a Hobart mixer and mixed at medium speed for 2 minutes. The resulting mass is spread out in a flat cookie pan and cut into individual bars.

Example 2

Example 1 is repeated with the exception that the water-soluble dietary fiber composition is added in the form of a gel containing 2.1 grams water-soluble dietary fiber composition and 6.3 grams water, instead of in a dry form.

Example 3

Example 1 is repeated with the exception that the dried food item is additionally admixed with 8 grams chocolate chips and 8 grams peanut butter. Again, the resulting product is a highly desirable, ready-to-eat food item.

What is claimed is:

1. A reduced-fat, ready-to-eat food item comprising a cereal component, a water-soluble dietary fiber composition component, and a binding agent, wherein a sufficient amount of each component is used to provide for said food item to be formed into a desired shape and maintain said shape, wherein said water-soluble dietary fiber composition component is prepared by method comprising treating an aqueous dispersion of a gelatinized, milled beta-glucan containing gain substrate with an alpha-amylase under conditions which will hydrolyze the substrate and yield a soluble fraction and an insoluble fraction, separating said soluble fraction from said insoluble fraction, and recovering from said soluble fraction said water-soluble dietary fiber substantially free of water insoluble fiber.

2. A food item according to claim 1 comprising from about 19% to about 52% by weight of cereal component.

3. A food item according to claim 2 wherein said cereal component comprises a mixture of flaked cereals and processed cereals.

4. A food item according to claim 3 wherein said cereal component comprises from about 8% to about 30% by weight oat flakes, from about 2% to about 20% by weight wheat flakes, and from about 5% to about 30% by weight crisp rice, based upon the total weight of the ready-to-eat food item.

5. A food item according to claim 2 comprising from about 0.6% to about 10% by weight of water-soluble dietary fiber composition component.

6. A food item according to claim 5 wherein the water-soluble dietary fiber composition component comprises maltodextrin and beta-glucans in a ratio in the range of from about 3:1 to about 15:1.

7. A food item according to claim 6 wherein the beta-glucan containing grain substrate is an oat substrate.

8. A ready-to-eat food item according to claim 6 wherein the soluble fraction is separated from the insoluble fraction with a single decanting step.

9. A food item according to claim 5 comprising from about 10% to about 35% by weight of a binding agent.

10. A food item according to claim 9 wherein the binding agent further comprises from about 0.5% to about 3% by weight water-soluble dietary fiber composition, based upon the total weight of the binding agent.

11. A food item according to claim 10 wherein the binding agent is a syrup comprising from about 1.5% to about 2.5% by weight water-soluble dietary fiber composition; from about 3% to about 15% by weight high maltose corn syrup; from about 3% to about 15% by weight high fructose corn syrup; from about 1% to about 7% by weight corn syrup solids; from about 1% to about 6% by weight glycerol; from about 0.5% to about 2% by weight sorbitol; and from about 0.1% to about 0.7% by weight salt, based upon the total weight of the ready-to-eat food item.

12. A food item according to claim 9 wherein the cereal and water-soluble dietary fiber composition components are first combined to form an initial mixture, said initial mixture is then combined with the binding agent when preparing the food item.

13. A food item according to claim 9 which further comprises from about 5% to about 25% by weight dehydrated fruit and from 1% to about 15% by weight edible nuts and/or nut pieces.

14. A ready-to-eat food item is in the form of a granola type food item comprising:
(a) a dry mix comprising from about 20% to about 50% by weight of a granola cereal component and from about 5% to about 20% by weight of a processed grain component, wherein said granola cereal component comprises:
(i) from about 18% to about 35% by weight of a base component, wherein said base component comprises from about 14% to about 32% by weight cereal flakes and from about 1.5% to about 3% by weight milk solids; and
(ii) from about 6% to about 15% by weight of a coating component, wherein said coating component comprises from about 5% to about 9% by weight sugar, from about 0.8% to about 1.3% by weight water-soluble dietary fiber composition, from about 0.3% to about 6% by weight of a sugar solution, and sufficient water to make the coating component liquid;
wherein said base component is enrobed by said coating component and wherein said enrobed base is dried to moisture content of below about 3.5 percent and wherein said water-soluble dietary fiber composition is prepared by a method comprising treating an aqueous dispersion of a gelatinized, milled beta-glucan containing grain substrate with an alpha-amylase under conditions which will hydrolyze the substrate and yield a soluble fraction and an insoluble fraction, separating said soluble fraction from said insoluble fraction, and recovering from said soluble fraction said water-soluble dietary fiber substantially free of water insoluble fiber; and
(b) sufficient binding agent to provide for said dry mix to be formed into a desired shape and maintain said shape;
wherein all of the weight percentages are percentages of the total weight of the ready-to-eat food item.

15. A food item according to claim 14 which further comprises from about 5% to about 25% by weight dehydrated fruit and from about 1% to about 15% by weight edible nuts and/or nut pieces.

16. A reduced fat, ready-to-eat food item in the form of a granola type food item comprising:
(a) from about 30% to about 60% by weight of a dry mix, wherein said dry mix comprises from about 20% to about 50% by weight of a granola cereal component and from about 5% to about 20% by weight of crisp rice, and wherein said granola cereal component comprises:
  (i) from about 18% to about 35% by weight of a base component comprising from about 10% to about 22% by weight oat flakes, from about 4% to about 10% by weight wheat flakes, from about 1.5% to about 3% by weight coconut and/or from about 0.009% to about 0.2% by weight natural coconut flavor, and from about 1.5% to about 3.0% by weight milk solids;
  (ii) from about 6% to about 15% by weight of a coating component comprising from about 5% to about 9% by weight sugar, from about 0.8% to about 1.3% by weight water-soluble dietary fiber composition, from about 0.3% to about 6% by weight honey, and sufficient water to make the coating component liquid;
  wherein said base component is enrobed by said coating component and wherein said enrobed base is dried to a moisture content of below about 3.5 percent and wherein said water-soluble dietary fiber composition is prepared by a method comprising treating an aqueous dispersion of a gelatinized, milled beta-glucan containing grain substrate with an alpha-amylase under conditions which will hydrolyze the substrate and yield a soluble fraction and an insoluble fraction, separating said soluble fraction from said insoluble fraction, and recovering from said soluble fraction said water-soluble dietary fiber substantially free of water insoluble fiber; and
(b) from about 10% to about 35% by weight of a syrup binding agent, wherein said syrup binding agent comprises from about 3% to about 15% by weight high maltose corn syrup; from about 3% to about 15% by weight high fructose corn syrup; from about 1% to about 7% by weight corn syrup solids; from about 1.5% to about 2.5% by weight water-soluble dietary fiber composition, from about 1% to about 6% by weight glycerol; from about 0.5% to about 2% by weight sorbitol; and from about 0.1% to about 0.7% by weight salt;
wherein of the weight percentages are percentages of the total weight of the ready-to-eat food item.

17. A food item according to claim 16 which further comprises from about 5% to about 25% by weight dehydrated fruit and from about 0% to about 15% by weight edible nuts and/or nut pieces.

18. A food item according to claim 17 having a density in the range of from about 0.25 to about 0.60 gram per cubic centimeter.

* * * * *